(12) United States Patent
Jeong et al.

(10) Patent No.: US 9,755,998 B2
(45) Date of Patent: *Sep. 5, 2017

(54) APPARATUS AND METHOD FOR IMPROVED ELECTRONIC MAIL

(71) Applicant: Samsung Electronics Co., Ltd., Gyeonggi-do (KR)

(72) Inventors: Wook-Hyun Jeong, Seoul (KR); Eun-Jung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 342 days.

This patent is subject to a terminal disclaimer.

(21) Appl. No.: 14/507,420

(22) Filed: Oct. 6, 2014

(65) Prior Publication Data
US 2015/0026280 A1    Jan. 22, 2015

Related U.S. Application Data

(63) Continuation of application No. 11/443,691, filed on May 31, 2006, now Pat. No. 8,862,669.

(30) Foreign Application Priority Data

May 31, 2005    (KR) .................. 10-2005-0046079

(51) Int. Cl.
*G06F 15/16*    (2006.01)
*H04L 12/58*    (2006.01)
(Continued)

(52) U.S. Cl.
CPC .......... *H04L 51/04* (2013.01); *G06Q 10/107* (2013.01); *H04L 51/28* (2013.01); *H04L 67/2857* (2013.01)

(58) Field of Classification Search
CPC ....... H04L 51/04; H04L 67/2857; H04Q 7/20; H04M 11/00
(Continued)

(56) References Cited

U.S. PATENT DOCUMENTS

| 5,742,668 A | 4/1998 | Pepe et al. |
| 6,052,709 A * | 4/2000 | Paul ............... G06Q 10/107 709/202 |

(Continued)

FOREIGN PATENT DOCUMENTS

| CN | 1343417 | 4/2002 |
| CN | 1430154 | 7/2003 |

(Continued)

OTHER PUBLICATIONS

Chinese Office Action dated Sep. 18, 2016 issued in counterpart application No. 201410302663.9, 25 pages.
(Continued)

*Primary Examiner* — El Hadji Sall
(74) *Attorney, Agent, or Firm* — The Farrell Law Firm, P.C.

(57) ABSTRACT

An E-mail apparatus and method are provided. The e-mail apparatus includes a memory that stores display names and e-mail addresses corresponding to the display names, and a controller that extracts an e-mail address from a received e-mail message, retrieves from the memory a display name corresponding to the extracted e-mail address, modifies the display name of the received e-mail message to the retrieved display name, and outputs the modified display name.

20 Claims, 3 Drawing Sheets

(51) Int. Cl.
*G06Q 10/10* (2012.01)
*H04L 29/08* (2006.01)

(58) Field of Classification Search
USPC ........................................ 709/206, 202, 203
See application file for complete search history.

(56) References Cited

U.S. PATENT DOCUMENTS

| | | | |
|---|---|---|---|
| 6,212,265 B1 * | 4/2001 | Duphorne | H04L 12/587 |
| | | | 379/100.08 |
| 6,298,128 B1 | 10/2001 | Ramey et al. | |
| 6,587,549 B1 | 7/2003 | Weik | |
| 6,895,426 B1 | 5/2005 | Cortright et al. | |
| 6,976,210 B1 * | 12/2005 | Silva | G06F 17/30867 |
| | | | 707/E17.109 |
| 8,918,466 B2 * | 12/2014 | Yu | H04L 51/12 |
| | | | 709/206 |
| 2002/0004384 A1 | 1/2002 | Kudoh | |
| 2002/0133557 A1 | 9/2002 | Winarski | |
| 2002/0137539 A1 | 9/2002 | Takahashi et al. | |
| 2003/0023443 A1 | 1/2003 | Shizuka et al. | |
| 2003/0126218 A1 | 7/2003 | Sakonsaku | |
| 2003/0233419 A1 | 12/2003 | Beringer | |
| 2004/0252677 A1 | 12/2004 | Kushita | |
| 2005/0234910 A1 | 10/2005 | Buchheit et al. | |
| 2006/0168038 A1 | 7/2006 | Lin | |
| 2006/0179114 A1 | 8/2006 | Deeds | |

FOREIGN PATENT DOCUMENTS

| | | |
|---|---|---|
| CN | 1170452 | 10/2004 |
| CN | 1574865 | 2/2005 |
| JP | 2001-265672 | 9/2001 |
| JP | 2002-024136 | 1/2002 |
| JP | 2005-005831 | 1/2005 |
| KR | 10-2002-0060386 | 7/2002 |
| WO | WO 00/54487 | 9/2000 |

OTHER PUBLICATIONS

Chinese Office Action dated May 4, 2017 issued in counterpart application No. 201410302663.9, 28 pages.

* cited by examiner

APPARATUS AND METHOD FOR IMPROVED ELECTRONIC MAIL

PRIORITY

This application is a Continuation Application of U.S. patent application Ser. No. 11/443,691, filed in the U.S. Patent and Trademark Office on May 31, 2006, and claims priority under 35 U.S.C. §119 to an application entitled "Apparatus and Method for Improved Electronic Mail" filed in the Korean Intellectual Property Office on May 31, 2005 and assigned Serial No. 10-2005-0046079, the contents of which are incorporated herein by reference.

BACKGROUND OF THE INVENTION

1. Field of the Invention

The present invention relates to an apparatus and method for improved electronic mail, and more particularly, to an apparatus and method for improved electronic mail in which the e-mail apparatus includes a memory for storing display names and e-mail addresses corresponding to the display names, and a controller for extracting an e-mail address from a received E-mail message, retrieving a display name corresponding to the extracted e-mail address from the memory, modifying the display name of the received e-mail message into the retrieved display name, and outputting the modified display name. Portable telecommunication terminal may include the apparatus and method for improved electronic mail.

2. Description of the Related Art

The development of the Internet has allowed people to be able to promptly and conveniently send and receive information via e-mail. Similar to conventional mail, the e-mail mail message has a sender's address and a recipient's address. Such information is sent while being stored in an e-mail header.

The header of the e-mail message includes information such as address fields of a sender ("from"), a reply recipient ("reply-to"), a recipient ("to"), a carbon copy (cc) recipient and a blind carbon copy (bcc) recipient. The e-mail sender provides the e-mail address or display name for each address field according to objects. The sender can directly input a recipient's e-mail address through an edit window, such that the recipient's e-mail address is included in the e-mail header. In this case, since the sender does not designate a specific display name, the e-mail address itself becomes the display name and is stored in the e-mail header.

However, if an e-mail client or e-mail server supports an address book function, the sender can store the information of the recipient's display name and e-mail address in the address book. Also, when the sender inputs the recipient's display name in the edit window, the e-mail client links it to data of the address book and extracts the corresponding e-mail address, and then automatically adds the extracted e-mail address to the e-mail header. At this point, the address field of the e-mail header is constructed in a form of the display name and the actual e-mail address.

This address inputting/displaying method is convenient for the sender. As to the recipient, however, the display name is extracted from the address field of the received e-mail header and then displayed for the recipient. Therefore, when the recipient and the sender store different display names in their address books with respect to the same e-mail address, the recipient sees the display name created based on the sender's address book.

While the existing e-mail service provides the function of linking the e-mail address to the address book when composing the e-mail message, it does not provide that function when receiving the e-mail message. This is an inconvenience to the recipient.

The display name provides a meaningful character sequence for the user's convenience. However, as to the recipient, the display name created based on the sender's address book is not meaningful and is unnecessary information. In this manner, the conventional e-mail service is convenient for the sender, but is inconvenient for the recipient.

SUMMARY OF THE INVENTION

The present invention provides an e-mail apparatus and method for retrieving a received e-mail address from a recipient's address book and displaying a display name and address designated by the recipient.

Also, the present invention provides an e-mail apparatus and method for retrieving a received e-mail address from a recipient's address book and displaying a group name and address designated by the recipient.

Further, the present invention provides an e-mail apparatus and method for retrieving a received e-mail address from a recipient's address book and storing the received e-mail message based on a group designated by the user.

According to the present invention, there is provided an e-mail apparatus including a memory for storing display names and e-mail addresses corresponding to the display names, and a controller for extracting an e-mail address from a received e-mail message, retrieving from the memory a display name corresponding to the extracted e-mail address, modifying the display name of the received e-mail message to the retrieved display name, and outputting the modified display name.

According to the present invention, there is provided a method of displaying an address in an e-mail apparatus, including determining whether a received e-mail address is contained in an address book, and if the received e-mail address is contained in the address book, extracting a display name corresponding to the received e-mail address from the address book, and modifying a display name of the received e-mail to the extracted display name.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. A detailed description of well-known features will be omitted for the sake of clarity and conciseness.

Figure 1:
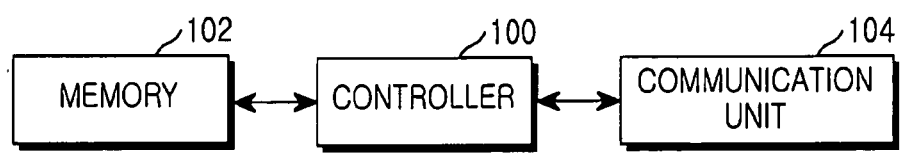
FIG. 1 is a block diagram of an e-mail apparatus for displaying an e-mail address by retrieving the address from a recipient's address book according to the present invention.

FIG. 1 is a block diagram of an e-mail apparatus for displaying an e-mail address by retrieving the address from a recipient's address book according to the present invention.

The e-mail address extracted from a received e-mail message includes a sender's address, a recipient's address, a carbon copy (cc) recipient's address and a blind carbon copy (bcc) recipient's address.

Referring to FIG. 1, the e-mail apparatus of the present invention includes a controller 100, a memory 102 and a communication unit 104. The controller 100 controls an overall operation of the e-mail apparatus. In addition, the controller 100 extracts an address from a received e-mail header and retrieves the extracted address from an address book stored in the memory 102. If the extracted address is contained in the address book, the controller 100 extracts a display name and a group name stored in the address book. Then, the controller 100 modifies the contents of the e-mail header and outputs the modified contents.

The memory 102 temporarily stores a program for controlling the overall operation and data generated during operations. Also, the memory 102 stores the address book containing such information as the display name, the group name and the e-mail address.

Figure 2:
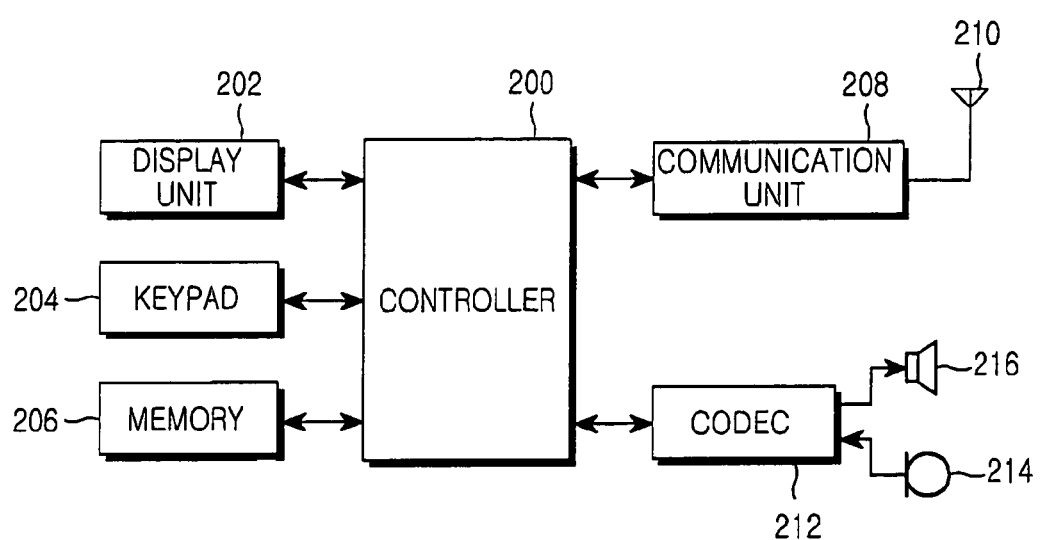
FIG. 2 is a block diagram of a portable telecommunication terminal for displaying an E-mail address by retrieving the address from a recipient's address book according to the present invention.

The communication unit 104 sends or receives the e-mail message via a wired or wireless network. The e-mail apparatus of the present invention is an e-mail server or an e-mail client for receiving an e-mail message. Examples of the e-mail client include a personal computer and a portable telecommunication terminal. FIG. 2 is a block diagram is a block diagram of a portable telecommunication terminal for displaying an e-mail address by retrieving the address from a recipient's address book according to the present invention.

Referring to FIG. 2, the portable telecommunication terminal that measures a reference slope includes a controller 200, a display unit 202, a keypad 204, a memory 206, a communication unit 208, an antenna 210, a coder-decoder (codec) 212, a microphone 214 and a speaker 216.

The controller 200 controls an overall operation of the portable telecommunication terminal. For example, the controller 200 processes and controls a voice communication and a data communication, and extracts an address from a received e-mail header and retrieves the extracted address from an address book stored in the memory 206. If the extracted address is contained in the address book, the controller 200 extracts a display name and a group name stored in the address book. Then, the controller 100 modifies the contents of the e-mail header and outputs the modified contents. The display unit 202 displays status information (or indicator) generated during operations, such as numerals and characters, moving pictures and still pictures. A color liquid crystal display (LCD) may be used for the display unit 202.

The keypad 204 includes numeric keys of digits 0-9 and a plurality of function keys, such as a Menu key, a Cancel (Delete) key, a Conformation key, a Talk key, an End key, an Internet connection key and Navigation keys (▲/▼/◄/►). In addition to the general functions, the keypad 204 further includes a slope measuring button such that a key input data corresponding to a key pressed by the user is transferred to the controller 200.

The memory 206 stores a program for controlling an overall operation of the portable telecommunication terminal. Also, the memory 206 temporarily stores data generated during operations and complementary data (e.g., telephone number, SMS message and picture data). In addition to the general functions, the memory 206 stores an address books containing a display name, a group name, and an e-mail address.

Upon a reception operation, the communication unit 208 performs a despreading and a channel decoding of a received signal by down-converting a frequency of an RF signal received through the antenna 210. Upon a transmission operation, the communication unit 208 performs a channel coding and a spreading of data, up-converts a frequency of the channel-coded and spread data, and transmits it through the antenna 210. Also, the communication unit 208 receives an identification number of a base station through a pilot channel. Further, the communication unit 208 transmits or receives an e-mail address.

The codec 212, microphone 214 and the speaker 216 connected to the codec 212 serve as an audio input/output block for a voice communication. The controller 200 produces PCM data and the codec 212 converts the PCM data into analog audio signals. The analog audio signals are outputted through the speaker 216. Also, the codec 212 converts audio signals received through the microphone 214 into PCM data and provides the PCM data to the controller 200.

Figure 3:
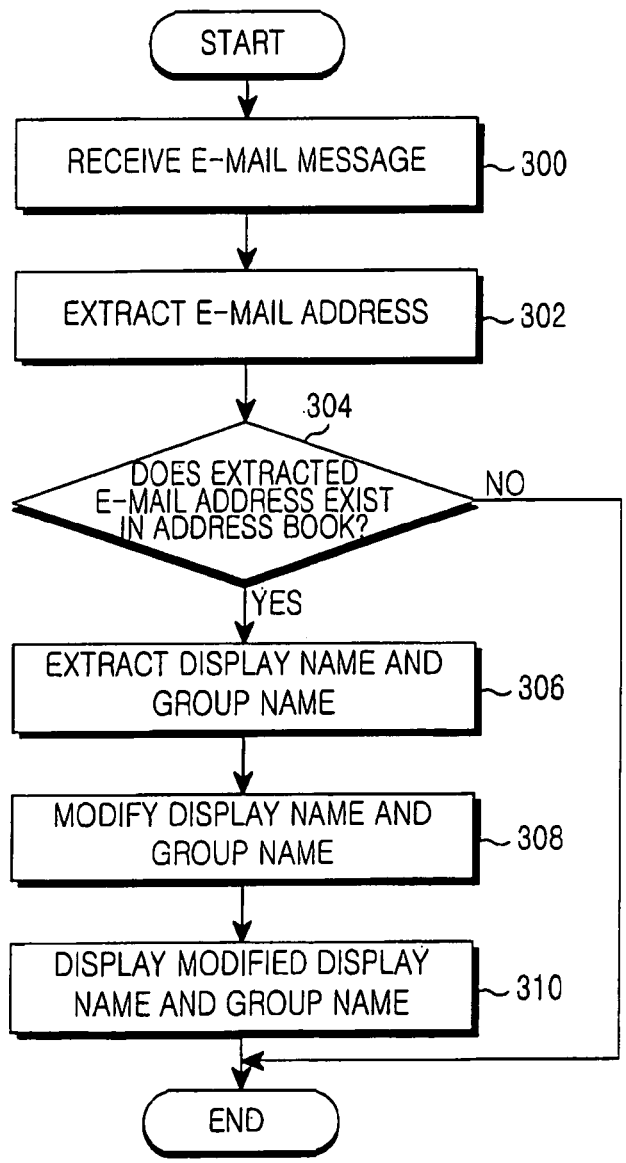
FIG. 3 is a flowchart illustrating a method of displaying an e-mail address by retrieving the address from a recipient's address book according to the present invention.

FIG. 3 is a flowchart illustrating a method of displaying an e-mail address by retrieving the address from a recipient's address book according to the present invention.

In operations 300 and 302, when an e-mail message is received, an e-mail address is extracted from a header of the received e-mail message.

In operation 304, it is determined whether the received e-mail address is contained in the address book by retrieving the extracted E-mail address from the address book stored in the memory.

If the received e-mail address is not contained in the address book, the process is terminated. On the contrary, in operation 306, if the received e-mail address is contained in the address book, a display name and a group name corresponding to the received e-mail address is extracted from the address book.

In operation 308, the header contents of the received e-mail message are converted or modified into the extracted display name and group name.

In operation 310, the received e-mail address is displayed with the converted or modified display name and group name.

According to the present invention, the group name as well as the display name is stored in the header of the received e-mail message. Therefore, when the recipient checks the received e-mail message, the display name and the group name designated to the recipient's address book can be displayed. Also, the received e-mails can be managed based on the groups.

According to the present invention, the e-mail apparatus includes a memory for storing display names and e-mail addresses corresponding to the display names, and a controller for extracting an e-mail address from a received e-mail message, retrieving a display name corresponding to the extracted e-mail address from the memory, modifying the display name of the received e-mail message into the retrieved display name, and outputting the modified display name. Therefore, the display name of the e-mail address is modified and displayed based on the recipient's address book, the group name is added, and the e-mail message is managed based on the group, thereby providing convenience to the e-mail user.

The foregoing embodiments are merely preferred and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A communication device comprising:
 a memory configured to store a plurality of e-mail addresses and a plurality of display names, with each e-mail address of the plurality of e-mail addresses having a corresponding display name; and
 a controller configured to:
 extract an e-mail address and a sender name from an e-mail message received by communication device,
 determine whether the extracted e-mail address corresponds to an e-mail address stored in the memory of the communication device,
 retrieve, from the memory of the communication device, a display name corresponding to an e-mail address stored in the memory of the communication device that is determined to correspond to the extracted e-mail address,
 detect a difference between the sender name extracted from the received e-mail message and the display name retrieved from the memory, and
 display, upon detecting the difference between the sender name extracted from the received e-mail message and the display name retrieved from the memory, the retrieved display name as a sender name of the received e-mail message.

2. The communication device of claim 1, wherein the controller is further configured to detect a difference between the sender name in a header of the received e-mail message and the display name of the retrieved e-mail address.

3. The communication device of claim 1, wherein the memory is further configured to store group names for categorizing each e-mail address of the plurality of e-mail addresses.

4. The communication device of claim 3, wherein the controller is further configured to retrieve a group name corresponding to the e-mail address retrieved from the memory and display the retrieved group name when displaying the received e-mail message.

5. The communication device of claim 4, wherein the controller stores the received e-mail message based on the retrieved group name.

6. A communication device comprising:
 a memory configured to store display names and e-mail addresses corresponding to the stored display names;
 a controller configured to:
 extract an e-mail address from a received e-mail message,
 determine whether the e-mail address is stored in the memory,
 retrieve, from the memory, a display name corresponding to the extracted e mail address, when the e-mail address is stored in the memory, and
 replace a sender name of the received e-mail message with the retrieved display name when the sender name of the received e-mail message differs from the retrieved display name; and
 a display configured to display the retrieved display name that replaced the sender name in the received e-mail message when displaying a body of the received e-mail message.

7. The communication device of claim 6, wherein the memory is further configured to store group names for categorizing the e-mail addresses, and
 wherein the controller is further configured to retrieve a group name corresponding to the e-mail address extracted from the memory and display the retrieved group name when displaying the received e-mail message.

8. The communication device of claim 7, wherein the controller is further configured to store the received e-mail message based on the retrieved group name.

9. The communication device of claim 6, wherein the display is further configured to display the e-mail message with the sender name, when the e-mail address is determined not to be stored in the memory.

10. The communication device of claim 6, wherein the e-mail address is stored in an address book in the memory.

11. A method of displaying an e-mail message in a communication device including a memory configured to store a plurality of display names and a plurality of e-mail addresses, with each e-mail address of the plurality of e-mail addresses having a corresponding display name, the method comprising:
 receiving an e-mail message;
 extracting an e-mail address and a sender name from the received e-mail message;
 determining whether the extracted e-mail address corresponds to an e-mail address stored in the memory of the communication device,
 retrieving, from the memory of the communication device, a display name corresponding to an e-mail address stored in the memory of the communication device that is determined to correspond to the extracted e-mail address,
 detecting a difference between the sender name extracted from the received e-mail message and the display name retrieved from the memory; and
 displaying, upon detecting the difference between the sender name extracted from the received e-mail message and the display name retrieved from the memory, the retrieved display name as a sender name of the received e mail message.

12. The method of claim 11, further comprising:
 detecting a difference between the sender name in a header of the received e-mail message and the display name of the retrieved e-mail address.

13. The method of claim 11, wherein the memory further stores group names for categorizing each e-mail address of the plurality of e-mail addresses.

14. The method of claim 13, further comprising:
 retrieving a group name corresponding to the e-mail address retrieved from the memory; and
 displaying the retrieved group name when displaying the received e-mail message.

15. The method of claim 14, further comprising storing the e-mail message based on the retrieved group name.

16. A method of displaying an e-mail message in a communication device including a memory that stores display names and e-mail addresses corresponding to the stored display names, the method comprising:
 receiving an e-mail message;
 extracting an e-mail address from the received e-mail message;

determining whether the extracted e-mail address is stored in the memory;

retrieving, from the memory, a display name corresponding to the extracted e-mail address, when the extracted e-mail address is stored in the memory;

replacing a sender name of the received e-mail message with the retrieved display name when the sender name of the received e-mail message differs from the retrieved display name; and displaying the retrieved display name that replaced the sender name in the received e-mail message when displaying a body of the received e mail message.

17. The method of claim 16, wherein the memory further stores group names for categorizing the e-mail addresses, the method further comprising:

retrieving a group name corresponding to the extracted e-mail address from the memory; and displaying the retrieved group name when displaying the e-mail message.

18. The method of claim 17, further comprising storing the e mail message based on the retrieved group name.

19. The method of claim 16, further comprising displaying the e mail message with the sender name of the e-mail message, when the e-mail address is determined not to be stored in the memory.

20. The method of claim 16, wherein the e-mail address is stored in an address book in the memory.

* * * * *